Feb. 20, 1968

J. W. HAND 3,369,761

GRINDING MILL AND FINENESS CONTROL SYSTEM

Filed Jan. 19, 1966

INVENTOR.
JOHN W. HAND
BY
Sheridan and Ross
ATTORNEYS

Feb. 20, 1968    J. W. HAND    3,369,761
GRINDING MILL AND FINENESS CONTROL SYSTEM
Filed Jan. 19, 1966    3 Sheets-Sheet 3

INVENTOR.
JOHN W. HAND
BY
Sheridan and Ross
ATTORNEYS

United States Patent Office 3,369,761
Patented Feb. 20, 1968

3,369,761
GRINDING MILL AND FINENESS
CONTROL SYSTEM
John W. Hand, 305 Kearney St.,
Denver, Colo. 80220
Filed Jan. 19, 1966, Ser. No. 521,719
14 Claims. (Cl. 241—33)

This invention lies in the field of apparatus for grinding coarse aggregate into fine-grained powder, such as metallic ores of various kinds and Portland cement. It is particularly directed to methods and apparatus for controlling the fineness of the product, including both the degree and the uniformity of such fineness.

In the production of Portland cement and other materials of like property, the usefulness of which depends upon a surface reaction of a solid material with water or other fluid and which reaction or hydration occurs at a slow rate, it is necessary to reduce the clinkers or fused lumps of solid material formed in the kiln to an extremely fine-grained powder in order that the hydration reaction will proceed to a conclusion within a reasonable time. With Portland cement in particular, the high correlation between the fineness of the powdered cement and the engineering properties of strength, hardness, and durability of the concretes, mortars, and pastes made with the cement is well known.

The cement producer who can control the fineness of his product so that it is uniform from one lot to the next will enjoy a much better reputation for quality of product in the market place. His materials will be highly desirable and acceptable because the users of cement are generally not equipped to measure the fineness and other properties of the cement purchased, which they must know in order to make the adjustments in the proportions of cement, water, and other materials in the mix which are necessary to produce concrete of uniform strength day after day.

It is well known that the rate of production of a grinding mill system is greatly reduced as the fineness of the product is increased, resulting in higher production costs. For this reason Portland cement of ASTM specification Type III, which is a very finely ground product, is generally sold for a higher price than is ASTM Type I, which is the normally ground product. Thus, to obtain maximum dollar value from the operation of his plant the cement producer must maintain a uniform fineness of product. This is difficult to achieve even in modern producing plants. On the one hand, the hardness or grindability of the clinker being ground into cement varies from time to time because of changes in chemical composition and changes in the degree of sintering which occurs in the kiln which is producing the clinker. On the other hand, the existing methods of measuring fineness and subsequently controlling it involves intricate, small scale, batch methods which are slow and cumbersome, and which are not based upon good statistical sampling techniques. These laboratory type techniques all have limitations which make them unsuitable for continuous, on-line, unattended control of large scale grinding mill circuits.

The simple, or straight line, grinding systems employ a grinding mill which receives the coarse aggregate and grinds it in a single pass, discharging it in a product stream which goes to a storage receiver. Tests are made more or less continuously, and if the product is too coarse the rate of feed to the mill is reduced so that the material passes through more slowly and is subjected to more grinding action. If the product is too fine the rate of feed is increased so that grinding time is reduced.

Closed circuit grinding systems use the same type of mill but the output is fed or transported to a separator or classifier which separates the fines from the coarser particles or tailings, and the latter are returned to the mill for another pass. This process is continuous and more efficient because less mill power is used in overgrinding the fine particles. The same general sort of sample testing is employed, and fineness control is achieved by adjusting the cut-point of the separator or classifier.

Where the product from the grinding mill is fairly coarse, for example where the maximum size particle permitted in the product stream is of the order of 500 microns in diameter or larger, wire mesh screens are commonly used to screen out the oversize particles and return them to the mill for further reduction in the closed circuit system, and the sample testing technique is not necessary. However, in the case of Portland cement, normally 85 percent or more of the product powder is less than 60 microns in diameter and the screening system is unsatisfactory because such a fine mesh screen is weak and wears out rapidly and is also readily clogged by the material. Hence, the sample testing system must be used in conjunction with an air separator.

The air separator is a large container through which the initial product of the mill passes. It depends on centrifugal and gravitational forces acting on the particles in opposition to the frictional force from a moving air stream to effect the separation. The cut-point, or particle size at which the separation is made, can be changed by varying the air velocity, adjusting the vanes or louvres in the unit, and by adjusting the fan speed. These adjustments are made in accordance with the sampling results and may be manual or automatic.

Theoretically, the control system described above should be highly satisfactory but it has various shortcomings which call for an improved system. Even though the separator adjustment devices remain unchanged, the particle size distribution will vary quite substantially because of changes in factors such as the rate of feed, the size consistency of the feed, the temperature of the feed, the condition of the air (pressure, temperature, and humidity), and the density of the material. In addition, the separator normally carries over into the product stream some particles which are oversize and returns a substantial amount of the fines with the tailings to the mill. Since the existing sampling and control systems operate solely on the basis of the maximum size particles in the product stream or on some type of average density reading it is apparent that the desired uniformity is not obtained. It is common for an unduly large percentage of the particles to be close to the maximum size so that the product is relatively coarse and therefore of lower quality and value.

The present invention largely overcomes the above difficulties in a simple and straightforward manner by using known standard equipment in a new combination and arrangement of parts based on the use of a different standard for fineness control. Generally stated, the system analyzes the product stream and determines the proportion or ratio of coarser particles to finer particles in the stream. To do this a particle diameter or size is selected which is intermediate the largest size particles permitted in the product stream and the smallest size particles produced. Generally it is desirable to select the midpoint. Thus, in the case of Portland cement, the maximum particle size is preferably about 60 microns and the selected intermediate size is 30 microns or a little less.

With this first standard, the proportion or ratio mentioned above is the ratio of the weight of material in the product stream representing particles larger than the selected size to the weight of the material representing particles smaller than the selected size. This ratio is then compared to a control ratio, which is the desired ratio determined by experience. For example, it may be one to one, with the smaller particles making up half of the total. Obviously, depending on the quality desired, or the purpose, or the nature of the material, the control ratio may have widely differing values. The important point is that for a given material and purpose the best value is determined for the control ratio and is then kept constant.

If the determined ratio is different from the control ratio, then the operation of the grinding system is adjusted to alter the particle size composition of the product stream in a direction to reduce or eliminate the difference. Thus, if the proportion of the coarser particles becomes too high the grinding system is adjusted to reduce this proportion, and vice versa. The adjustments may be made manually by an operator who observes and compares the ratios, but preferably the entire system is automated. In the straight line grinding system the adjustment consists in increasing or decreasing the rate of feed to the inlet of the mill. In the closed circuit system the adjustment consists in changing the cut-point by adjusting the fan speed or the vanes or louvres in the unit, or both.

Although the ratio of the weights of material in the flow stream above and below the selected particle size may be determined in many ways, including separating the entire stream and weighing the sub-streams, it is preferred to use a sample analyzing technique. Briefly, a running sample of the flow stream, preferably about five percent of the total, is taken by a sample splitter and a first sample stream is established. This stream is then separated by a control separator into second and third sample streams. The control separator is similar to the production separator but much smaller because it has to handle far less material. The second and third streams contain the particle groups above and below the selected intermediate particle size. Any two of the three streams may now be weighed and a ratio established and compared with the control ratio. It will be obvious that the control ratios are readily convertible. For instance, with the example given above, if the second two streams are weighed, their ratio should match a control ratio of one to one. If the first stream and either the second or third stream are weighed, their ratio should match a control ratio of two to one. In either case, the condition is the same.

The automated fineness control system which adjusts the source of the flow stream, either the straight line mill or the production separator, may be mechanical, including hydraulic and pneumatic devices, or electrical, including analog computer systems and electro-mechanical devices.

It has been determined that the uniformity of product has been immeasurably improved by the use of the system described above. With the existing techniques, maximum particle size can be controlled fairly accurately but the particle sizes in the mix may be almost entirely coarse or almost entirely fine. With the new technique the mix is always properly proportioned above and below the selected intermediate particle size, with the size and the ratio being chosen according to the desired end use. The sample taken is large enough to be statistically meaningful and it is normally taken continuously so that correction is continuous and instantaneous, resulting in practically no departure from the standard. In cases where the product stream happens to be very uniform for long periods, the sampling can be done intermittently on any desired time schedule.

In addition to the fact that the new sampling system is far superior in accuracy to the existing small batch system, it is very efficient because the second and third sample streams are delivered back to the product stream and no processed material is wasted.

Various other advantages and features of novelty will become apparent as the description proceeds in conjunction with the accompanying drawings, in which.

Figure 1:
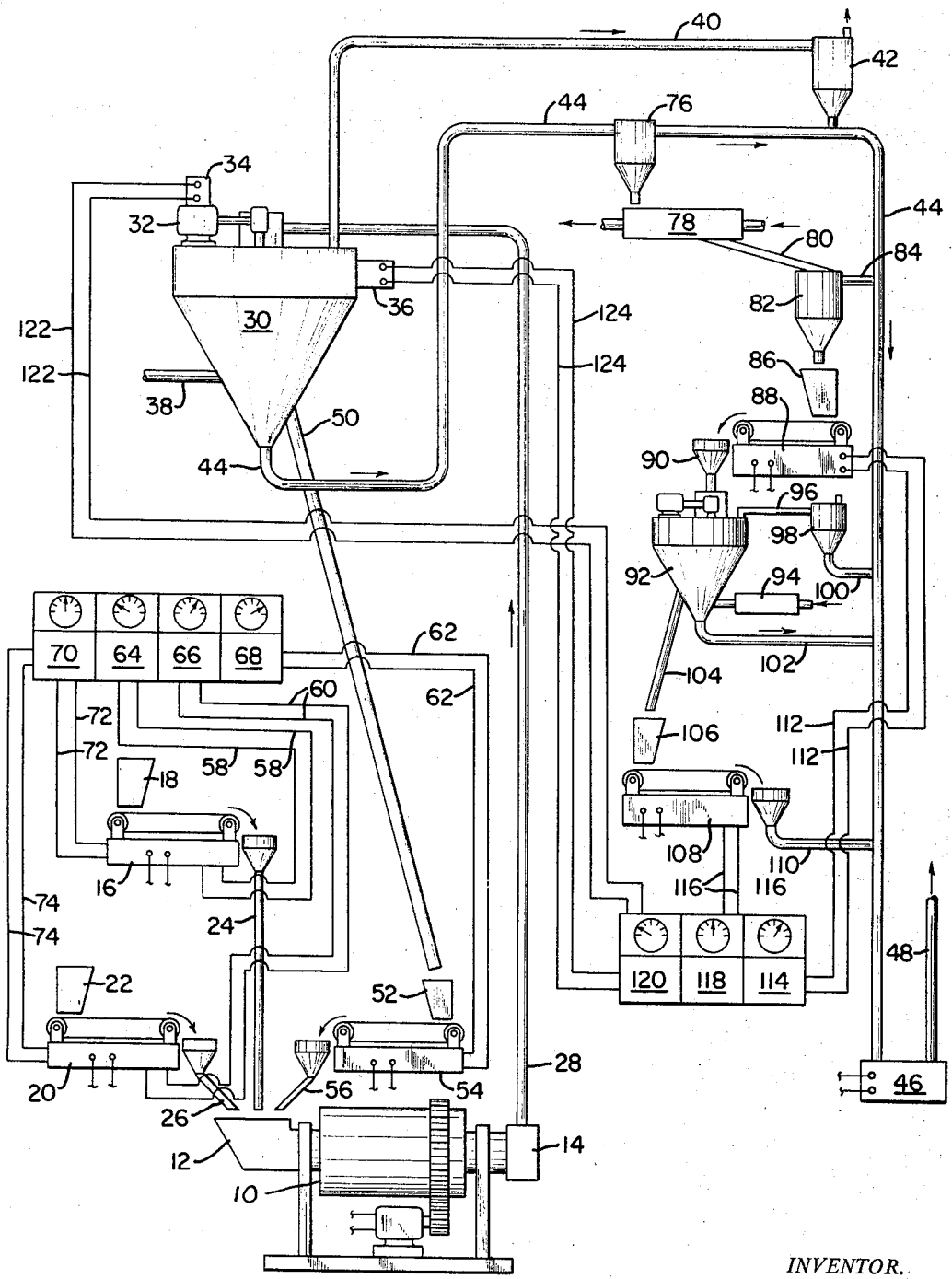
FIG. 1 is a diagrammatic view, generally in elevation, of a closed circuit grinding mill system incorporating the invention.

A typical closed circuit grinding mill system working in conjunction with the new system for maintaining uniform fineness and quality of the product stream is diagrammatically illustrated in FIG. 1 in which the conventional grinding mill 10 is provided with an inlet scoop 12 and an outlet boot 14. The mill is fed with raw stock by a first weighing feeder 16 having a storage bin 18 of clinker and a second weighing feeder 20 having a bin 22 of set retarder gypsum. The feeders are standard motor driven belt conveyors which dump their outflow into chutes 24 and 26 respectively, the latter serving to feed the supplies to inlet scoop 12.

The output from the mill is transported through conduit 28 to a standard production air separator 30 provided with a fan motor 32 having a control unit 34. A control unit 36 includes servo motor means to adjust the usual vanes or louvres, not shown, within the separator. An air inlet is provided at 38 and an air outlet at 40, the latter leading to a dust collector 42.

The fine material separated out in the production separator issues as the product stream and flows through conduit means 44 to an outlet booth 46 which is provided with a cement pump, not shown, to feed the product through conduit 48 to a storage receiver. The rejected coarser particles, or tailings, pass through conduit 50 to bin 52, onto weighing feeder 54 and through chute 56 back to inlet 12.

Feeders 16, 20, and 54 are provided with conventional means for sensing the instantaneous weights of material on the conveyor belts, such as potentiometers, and send signals by conductors 58, 60, and 62 to units 64, 66, and 68 respectively of a general purpose computer. The computer is set to control the total flow of material into the mill at a constant rate. The amount of tailings returned over feeder 54 must be subtracted from the total in order to determine the amount of new feed. The information from units 64, 66, and 68 is supplied to unit 70 which in turn sends appropriate signals to feeders 16 and 20 through conductors 72 and 74. All of this is standard procedure in present day closed circuit grinding systems.

In order to properly control the fineness of the particles in the product stream as described above an analyzing system and fineness control system are provided. Sample splitter 76 communicates with conduit means 44 and continuously extracts a sample of the product steam to an extent of about five percent of the total. It discharge a first sample stream into heat exchanger 78 through which air or water is passed to reduce the material to a constant suitable temperature such as about 150 degrees F., and the material then passes through conduit 80 to constant head bin 82. Any excess or overflow material passes through conduit 84 back to the product stream conduit means 44.

The majority of the material passes to bin 86 and weighing feeder 88, and chute 90, and then into the control separator 92. This separator is substantially identical with separator 30 although far smaller in size. Air for this seperator is supplied through air conditioner 94 so that its humidity and temperature can be accurately controlled, and it exhausts through conduit 96 to dust collector 98, the dust returning to conduit 44 through conduit 100.

The fines from separator 92 are returned to the product stream through conduit 102 as a second sample stream and the tailings pass through conduit 104 as a third sample stream. The tailings drop into bin 106 and are deposited on weighing feeder 108 which transfers them to conduit 110, and they return to the product stream. Weight indication signals from feeder 88 are transmitted through conductors 112 to unit 114 of an analog computer, and similar signals from feeder 108 are transmitted through conductors 116 to unit 118. Information is fed from units 114 and 118 to unit 120 which determines the difference between the determined ratio of weights and the control ratio which has been pre-selected.

While all of the circuitry involved is quite standard and readily designed by those skilled in the art, it may be stated briefly that the weighing feeders, which preferably are counterbalanced to eliminate their empty weight as a factor, are movable under the weights of the material loads to adjust potentiometers which produce voltages proportional to the material weights. These voltages are fed to a conventional dividing circuit in a general purpose computer which produces a signal indicative of the ratio of the material weights. Other signals are fed into a second dividing circuit to produce a signal indicative of the desired control ratio. These two ratio signals are applied to a difference amplifier, the output of which is a signal representative of the difference between the determined ratio and the control ratio. The apparatus may be aptly described as a comparator.

The final output signal is transmitted from unit 120 by conductors 122 and 124 to the fan motor control unit 34 and to the vane control unit 36, or to only one of them if desired. These control units then adjust the function of the production separator 30 to raise or lower the cut-point as required by the nature of the signal received.

The cut-point of control separator 92 is, of course, set to separate the particles at the intermediate size which has been selected as desirable for the purpose. Therefore the material issuing through conduit 102 is that which is finer or smaller than the selected size, and the material issuing through conduit 104 is that which is coarser or larger than the selected size. Using the example previously given, the ratio of weights of these second and third sample streams should be one to one. With the apparatus as illustrated, the first and third streams are weighed and compared and since the first stream is the total sample, the ratio should be two to one. Obviously any two of the streams may be weighed and compared so long as the proper control ratio is used. The computer can be readily set to operate on the basis of any desired ratio.

It will be observed that with the construction and arrangement of apparatus as disclosed, the production separator will basically perform its usual task of limiting the maximum size of particles in the product stream within the usual range of accuracy. In addition the analyzing system and fineness control system will adjust the functions of the separator so that the product stream will also incorporate the desired proportion of material of the smaller particle sizes, this latter condition being essential to the production of high quality cement and being quite important in the production of many other powdered materials.

Figure 3:
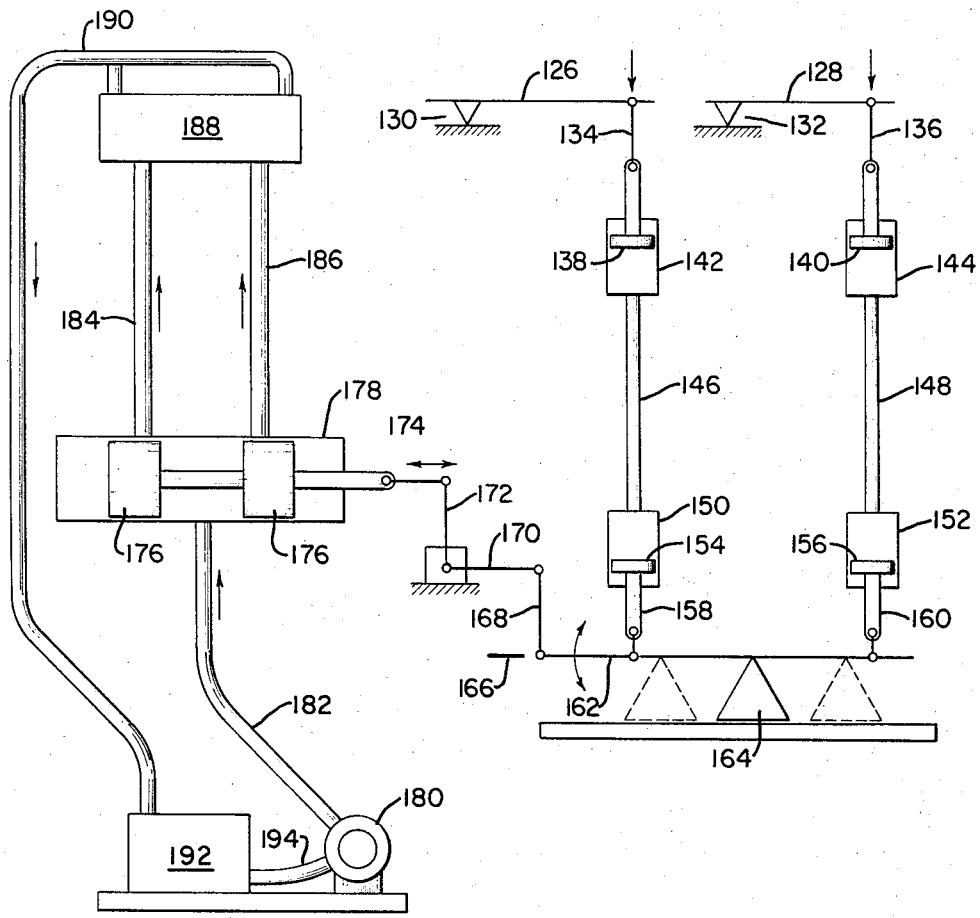
FIG. 3 is a similar view of a mechanically operated fineness control system.

A simple mechanical sensing and controlling system, which may be hydraulic or pneumatic, is diagrammatically illustrated in FIG. 3. Weighing feeders 126 and 128 are pivotally mounted at 130 and 132, and they are connected by piston rods 134 and 136 to pistons 138 and 140, slidable in cylinders 142 and 144. The pistons exert pressure on fluid in the cylinders, which pressure is transmitted through conduits 146 and 148 to cylinders 150 and 152. The pressure is here applied to pistons 154 and 156 and thence through rods 158 and 160 to ratio arm 162. The latter is pivotally mounted on fulcrum 164 which may be adjusted as indicated to achieve any desired ratio, and when the arm is aligned with reference mark 166, the control ratio is achieved.

Arm 162 is connected by link 168 to one arm 170 of a bell crank, the other arm 172 being connected to the stem 174 of a piston valve 176 in valve chamber 178. Pump 180 supplies pressure fluid to the valve through conduit 182, and the fluid passes through either conduit 184 or conduit 186, depending on the direction of displacement of valve 176, to actuate servo motor 188, which is a typical device for controlling one or more functions of the production separator. Return line 190 leads to reservoir 192, from which the pump is supplied through conduit 194.

The above is merely exemplary of one mechanical construction which would be useful in carrying out the purposes of the invention and is not intended to be in any way restrictive. It will be apparent to those skilled in the art that the controlling operation could be accomplished directly by utilizing suitable links, levers, and cables.

Figure 2:
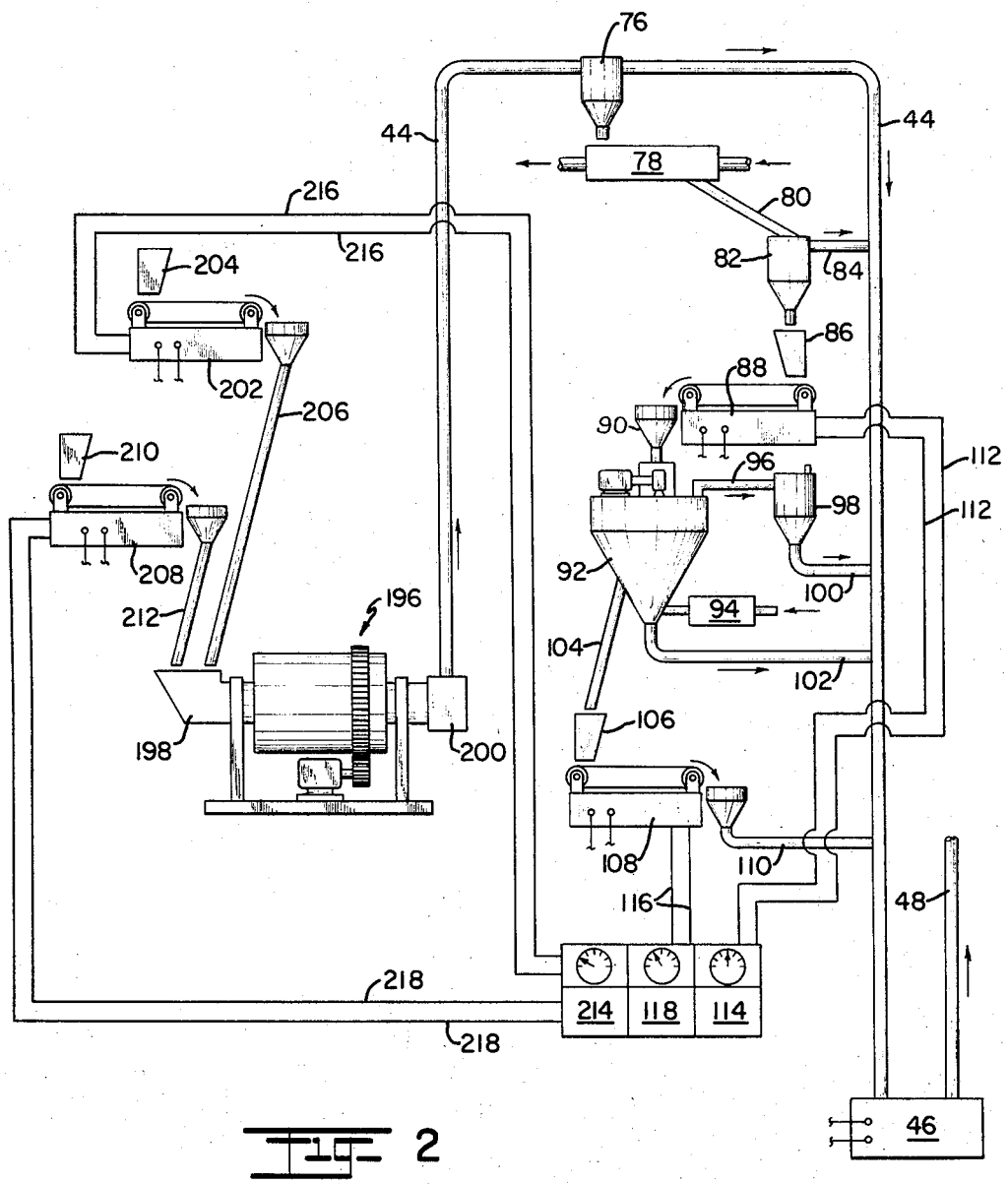
FIG. 2 is a similar view of a straight line grinding mill system.

The invention can be applied in substantially the same way to a straight line grinding mill system as illustrated in FIG. 2. In this figure a standard grinding mill 196 is provided which is essentially the same as the mill 10 of FIG. 1, and is provided with an inlet scoop 198 and an outlet boot 200. A first weighing feeder 202 is provided with a bin 204 of clinker. The clinker travels across the feeder and is discharged into chute 206, which in turn discharges into inlet scoop 198. A second weighing feeder 208 is provided with a bin 210 of gypsum. The latter travels across the feeder and is discharged into chute 212, which also discharges into chute 198. These two feeders constitute the sole supply to the mill because there is no tailings feedback in the straight line system.

As the mill grinds the raw material it gradually discharges the fine-grind powder product into boot 200. The material is then fed onward into conduit means 44 as the product stream. From this point on, the sample analyzing and fineness control system are constructed and operated in the same way as the system of FIG. 1, down to the comparator output unit 214, and there is no need to repeat the detailed description.

The comparator unit 214 is essentially the same as unit 120 of FIG. 1 but has the primary function of controlling the proportions of clinker and gypsum fed to the mill by sending appropriate signals to weighing feeders 202 and 208 through conductors 216 and 218 respectively. It also regulates the basic pre-selected rate of feed to the mill. The signal produced by the difference amplifier is applied to the control system to modify the signals to each of the feeders to the same extent so that the proportions of gypsum and clinker will not be changed. When the sample analysis indicates that the proportion of fines, or smaller particles, is too low the signals from unit 214 reduce the rate of feed so that the raw material will undergo grinding for a longer period of time, and vice versa.

Since the comparator can control the "source" of the product stream whether it be the production separator or the grinding mill, it follows that a refinement of the system of FIG. 1 may include control of both the grinding mill and the production separator if desired.

The complete grinding mill system as discloeed herein retains all of the advantages of the conventional systems, including control of the maximum particle sizes, but incorporates the control which has previously been lacking, control of the particle size distribution. For the first time, control of the source has been based on comparison of the quantities of product on opposite sides of a selected intermediate size of particle rather than on measurement of mere maximum particle size, thus insuring an adequate proportion of very fine-grained material and a high specific surface for the total mix.

It will be apparent to those skilled in the art that various changes may be made in the construction and arrangement of parts as disclosed without departing from the spirit of the invention, and it is intended that all such changes shall be embraced within the scope of the following claims.

I claim:

1. Apparatus for reducing a coarse aggregate to a fine-grained powder product and for continuously controlling the fineness and particle size distribution of the product, comprising: a grinding mill having an inlet and an outlet; supply means to continuously feed fresh aggregate to the mill inlet; a production separator; conduit means extending between the mill outlet and the separator to transport ground material to the latter; said separator being adapted to separate the finer particles of the material and send them onward as a product stream and to reject the coarser particles as tailings; conduit means extending between the separator and the mill inlet to return the tailings to the latter; product stream conduit means to transport the product from the production separator to a storage receiver; a sample splitter communicating with said product stream conduit means to withdraw a sample portion of the product stream for analysis; first weighing means communicating with the sample splitter to receive and weigh said sample portion; a control separator adapted to receive the sample portion and to separate it into finer and coarser particle groups, and being pre-set to make the separation at a particle diameter cut-point approximately at the midpoint or smaller of the range of particle sizes in the product stream; second weighing means to receive and weigh one of the particle groups from the control separator and to pass it on to the product stream conduit means; additional means to receive the other particle group from the control separator and transport it to the product stream conduit means; and a fineness control system to maintain a desired ratio between the quantities of finer and coarser particles in the product stream as determined by said control separator; said fineness control system including means communicating with each of said weighing means and acting to transmit to said production separator indications of the departure of the ratio of weights of product on said weighing means from a control ratio fixedly related to said desired ratio; and means associated with said production separator acting in response to said indications to alter the particle size composition of the product stream in a direction to restore said desired ratio.

2. Apparatus as claimed in claim 1; said sample splitter, control separator, weighing means, and fineness control system operating intermittently in accordance with a predetermined time schedule.

3. Apparatus as claimed in claim 1; said sample splitter, control separator, weighing means, and fineness control system operating continuously to maintain the cut-point of said production separator continuously at values producing a uniform product stream.

4. Apparatus as claimed in claim 1; said fineness control system operating mechanically.

5. Apparatus as claimed in claim 1; said fineness control system operating electrically.

6. Apparatus as claimed in claim 1; said fineness control system comprising a comparator having a neutral reference position pre-set to represent a control ratio of weights of product on said weighing means, which control ratio bears a fixed relation to said desired ratio; means to transmit to said comparator indications of the weight of product on each of said weighing means; means in said comparator to establish the ratio of said weights for comparison with said control ratio; means to transmit to said production separator indications of the difference between said last mentioned two ratios; and means at said production separator to alter the cut-point in response to said indications.

7. Apparatus as claimed in claim 6; said comparator being an analog computer device.

8. Apparatus for producing a continuous product stream of a fine-grained powder material and continuously controlling the particle size distribution, comprising: a source of a continuous product stream of a fine-grained powder material; a product stream conduit to transport the product from the source to a storage receiver; a sample analyzer; and a fineness control system; said sample analyzer comprising means to withdraw a product sample from the conduit as a first sample stream; means to separate said first sample stream into second and third sample streams, one containing particles primarily larger than a selected intermediate size and the other containing particles primarily smaller than said selected size; and weighing means to simultaneously determine the weight of the mass of particles in two of said sample streams; said fineness control system comprising means to establish the ratio of said weights and compare it with a control ratio; means to transmit to the source of the product stream indications of the difference between said ratios; and means at said source acting in response to said indications to alter the particle size composition of the product stream in a direction to eliminate the difference between said ratios.

9. Apparatus as claimed in claim 8; said product stream source being a production separator; and said means to alter the particle size composition comprising means to alter the cut-point of said separator.

10. Apparatus as claimed in claim 8; said product stream source being a grinding mill; and said means to alter the particle size composition comprising means to alter the feed to the mill.

11. Apparatus as claimed in claim 8; said selected intermediate size being a particle diameter at the midpoint or smaller of the range of sizes in the product stream.

12. Apparatus as claimed in claim 8; said selected intermediate size being of the order of 30 microns.

13. Apparatus as claimed in claim 8; said weighing means being belt type conveyors, each adapted to determine the instantaneous weight of that portion of the sample stream carried by the conveyor at any given time.

14. Apparatus for producing and controlling the quality of a fine-grained powder material, comprising: a source of a product stream of a fine-grained powder material; means to determine the ratio of the weights of material in said product stream which are above and below a selected particle size diameter; means to compare said determined ratio with a selected control ratio; and means to adjust the operation of said source to alter the particle size composition of the product stream in a direction to eliminate the difference between said ratios.

References Cited

UNITED STATES PATENTS

| | | | |
|---|---|---|---|
| 2,335,853 | 12/1943 | Frisch | 241—33 |
| 3,148,971 | 9/1964 | MacDonald. | |
| 3,153,587 | 10/1964 | Schuerger. | |
| 3,179,345 | 4/1965 | Kivert | 241—34 X |
| 3,314,614 | 4/1967 | Daniel | 241—34 X |

HARRISON L. HINSON, *Primary Examiner.*